(12) United States Patent
Fuchs et al.

(10) Patent No.: US 10,576,832 B2
(45) Date of Patent: Mar. 3, 2020

(54) ELECTRICAL CONNECTING DEVICE AND CHARGING CABLE FOR AN ELECTRIC VEHICLE

(71) Applicant: Siemens Aktiengesellschaft, Munich (DE)

(72) Inventors: Thomas Fuchs, Regensburg (DE); Alexander Mundry, Hengersberg (DE); Gerald Noerl, Burglengenfeld (DE); Christian Riembauer, Bad Abbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 23 days.

(21) Appl. No.: 15/038,885

(22) PCT Filed: Nov. 14, 2014

(86) PCT No.: PCT/EP2014/074606
§ 371 (c)(1),
(2) Date: May 24, 2016

(87) PCT Pub. No.: WO2015/113666
PCT Pub. Date: Aug. 6, 2015

(65) Prior Publication Data
US 2017/0001529 A1   Jan. 5, 2017

(30) Foreign Application Priority Data

Jan. 31, 2014   (DE) .................. 10 2014 201 764

(51) Int. Cl.
*B60L 53/16* (2019.01)
*B60L 53/18* (2019.01)
(Continued)

(52) U.S. Cl.
CPC ........... *B60L 11/1824* (2013.01); *B60L 50/40* (2019.02); *B60L 53/16* (2019.02); *B60L 53/18* (2019.02);
(Continued)

(58) Field of Classification Search
CPC ............. H01R 13/6683; B60L 11/1824; B60L 11/005; B60L 11/1818; B60L 11/1864
(Continued)

(56) References Cited

U.S. PATENT DOCUMENTS 5,596,258 A *  1/1997  Kimura ................. B60L 3/0084
                                                                320/109
7,798,845 B1 *  9/2010  Buchanan .......... H01R 13/6397
                                                                439/502
(Continued)

FOREIGN PATENT DOCUMENTS

DE    102010045131 A1    3/2012
DE    102012200523 A1    8/2012
(Continued)

OTHER PUBLICATIONS

Mahdjour Hooshiar [DE]; Burns Oliver [DE]; Idczak Torsten [DE], Device for Electrically Charging Electric Vehicle at Loading Station, Jan. 3, 2013 (Year: 2013).*
(Continued)

*Primary Examiner* — Edwin A. Leon
*Assistant Examiner* — Milagros Jeancharles
(74) *Attorney, Agent, or Firm* — Harness, Dickey & Pierce, P.L.C.

(57) ABSTRACT

An electrical connecting device for a charging cable is for charging an electric vehicle. The electrical connecting device includes a network-side first connecting element for electrically connecting the connecting device to an electrical supply network and a charging-cable-side second connect-
(Continued)

ing element for connecting the connecting device to a network-side connector of the charging cable. The first connecting element includes at least two contact elements, each connected in an electrically conductive manner to one of at least two contact elements of the second connecting element; and a first temperature sensor, used for temperature monitoring and which is electrically connected to the second connecting element via a communication cable. The second connecting element has a further contact, connectable to a corresponding further contact of the network-side connector of the charging cable to transmit a signal of the temperature sensor to the charging cable.

29 Claims, 5 Drawing Sheets

(51) Int. Cl.
| | |
|---|---|
| H01R 13/66 | (2006.01) |
| B60L 11/18 | (2006.01) |
| H02H 5/04 | (2006.01) |
| B60L 53/65 | (2019.01) |
| B60L 50/40 | (2019.01) |
| B60L 53/30 | (2019.01) |
| H01R 31/06 | (2006.01) |

(52) U.S. Cl.
CPC ............... *B60L 53/30* (2019.02); *B60L 53/65* (2019.02); *H01R 13/6616* (2013.01); *H01R 13/6683* (2013.01); *H02H 5/042* (2013.01); B60L 2240/36 (2013.01); H01R 31/065 (2013.01); H01R 2201/26 (2013.01); Y02T 10/7005 (2013.01); Y02T 10/7022 (2013.01); Y02T 10/7088 (2013.01); Y02T 90/121 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(58) Field of Classification Search
USPC .................................. 439/620.21, 502, 638
See application file for complete search history.

(56) References Cited

U.S. PATENT DOCUMENTS

| | | | | |
|---|---|---|---|---|
| 8,339,760 | B2* | 12/2012 | Rabu ..................... | H01R 31/06 361/103 |
| 8,723,477 | B2* | 5/2014 | Gaul .................... | B60L 3/0069 320/109 |
| 8,729,856 | B2 | 5/2014 | Nathan et al. | |
| 8,922,967 | B2 | 12/2014 | Goelz et al. | |
| 8,981,731 | B1* | 3/2015 | Oku ....................... | H02J 7/027 320/107 |
| 9,211,801 | B2* | 12/2015 | Akai ..................... | H01M 10/44 |
| 9,490,640 | B2* | 11/2016 | Pham ................... | H02J 7/0029 |
| 9,509,156 | B2* | 11/2016 | Takao ................... | H02J 7/0054 |
| 9,515,498 | B2* | 12/2016 | Nishikawa ........... | H02J 7/0088 |
| 9,590,367 | B1* | 3/2017 | Sumner ............... | B60L 11/1818 |
| 9,751,413 | B2* | 9/2017 | Im ....................... | B60L 11/1816 |
| 9,812,819 | B2* | 11/2017 | Kawamoto ........ | H01R 13/6683 |
| 9,876,317 | B2* | 1/2018 | Glick ................... | H01R 31/06 |
| 10,046,658 | B2* | 8/2018 | Mueller ............... | H01R 31/06 |
| 2007/0006603 | A1 | 1/2007 | Reusche et al. | |
| 2009/0316321 | A1* | 12/2009 | Ouwerkerk ........... | H02H 5/046 361/106 |
| 2011/0149455 | A1* | 6/2011 | Ueno .................... | B60L 3/0069 361/87 |
| 2011/0204715 | A1* | 8/2011 | Nakamura .......... | B60L 11/1818 307/10.1 |
| 2011/0204849 | A1* | 8/2011 | Mukai .................. | B60L 3/0069 320/111 |
| 2011/0300753 | A1* | 12/2011 | Ichikawa .............. | B60L 3/0069 439/620.21 |
| 2012/0139335 | A1* | 6/2012 | Holland ................. | B60L 58/15 307/9.1 |
| 2012/0249066 | A1* | 10/2012 | Ichikawa .............. | B60K 6/445 320/109 |
| 2012/0282798 | A1* | 11/2012 | Oe ....................... | B60L 11/1816 439/369 |
| 2013/0201641 | A1* | 8/2013 | Soden ....................... | B60L 3/04 361/752 |
| 2013/0335024 | A1* | 12/2013 | Akai ..................... | H01M 10/44 320/109 |
| 2014/0002024 | A1* | 1/2014 | Ang ...................... | H02J 7/0036 320/109 |
| 2014/0035527 | A1* | 2/2014 | Hayashigawa ....... | B60L 53/305 320/109 |
| 2014/0179164 | A1* | 6/2014 | Kanamori ................ | B60D 7/00 439/620.21 |
| 2014/0203777 | A1* | 7/2014 | Flack ........................ | B60L 3/04 320/109 |
| 2014/0306520 | A1* | 10/2014 | Oe ..................... | H01R 13/6275 307/9.1 |
| 2016/0039297 | A1* | 2/2016 | Kretschmer ........ | B60L 11/1818 320/109 |
| 2016/0059719 | A1* | 3/2016 | Jung ................... | B60L 11/1818 320/109 |
| 2016/0059731 | A1* | 3/2016 | Jung ................... | B60L 11/1818 320/109 |
| 2016/0075244 | A1* | 3/2016 | Im ...................... | H01R 13/7137 320/107 |
| 2018/0050599 | A1* | 2/2018 | Sauer .................. | B60L 11/1818 |

FOREIGN PATENT DOCUMENTS

| | | | | |
|---|---|---|---|---|
| DE | 102012202051 A1 | | 9/2012 | |
| DE | 102011007763 A1 | * | 10/2012 | ......... H01R 13/6397 |
| DE | 102011007763 A1 | | 10/2012 | |
| DE | 102011017259 A1 | | 10/2012 | |
| DE | 102011106335 A1 | * | 1/2013 | ................ B60L 3/00 |
| DE | 102011106335 A1 | | 1/2013 | |
| DE | 102011084527 A1 | | 4/2013 | |
| GB | 2489988 A | | 10/2012 | |
| WO | WO 2012099978 A2 | | 7/2012 | |
| WO | WO 2014005567 A2 | | 1/2014 | |

OTHER PUBLICATIONS

Lazzaro Volker "Ladesysteme für Elektrofahrzeuge"; XP055059064; gefunden im Internet: URL:http://www.emfm.de/downloads/spezifikation-mennekes-ladesysteme-revIO.pdf; 2009.
German Search Report for Application No. DE 10 2014 201 764.5.
International Search Report PCT/ISA/210 for International Application No. PCT/EP2014/074606 dated Oct. 6, 2015.
Written Opinion of the International Searching Authority PCT/ISA/237 for International Application No. PCT/EP2014/074606 dated Oct. 6, 2015.
Office Action for Chinese Patent Application No. 201480070164.X dated Sep. 29, 2017.

* cited by examiner

ELECTRICAL CONNECTING DEVICE AND CHARGING CABLE FOR AN ELECTRIC VEHICLE

PRIORITY STATEMENT

This application is the national phase under 35 U.S.C. § 371 of PCT International Application No. PCT/EP2014/074606 which has an International filing date of Nov. 14, 2014, which designated the United States of America and which claims priority to German patent application number DE 102014201764.5 filed Jan. 31, 2014, the entire contents of which are hereby incorporated herein by reference.

FIELD

An embodiment of the invention generally relates to an electrical connecting device for a charging cable for charging an electric vehicle. An embodiment of the invention further generally relates to a charging cable for charging an electric vehicle having an electrical connecting device of this kind.

Embodiments are concerned with the design and manner of operation of a charging device which enables electrical charge—in particular from a public power supply system—to be supplied to a battery, a capacitor or some other storage device for electrical charge in an electric vehicle.

BACKGROUND

Electrical batteries or power storage devices have to be recharged at regular intervals. In this case, the term "electric vehicle" should be understood to mean both electric cars and also electric scooters or electric bicycles etc. In respect of electric cars, the term "electric vehicle" covers both purely electrically operated vehicles and also so-called hybrid vehicles which have an additional drive, for example an internal combustion engine, in addition to an electric drive.

On account of the increasing popularity of electric vehicles, new requirements are being placed on the charging infrastructure, which is also called Electric Vehicle Supply Equipment, for short: EVSE, in respect of the charging process of an electric vehicle, in particular an electric car. The term EVSE should be understood to mean—in accordance with IEC Standard 61851 (DIN EN 61851)—a power supply device for charging electric road vehicles, including plug-in hybrid electric vehicles.

These power supply devices include, for example, charging stations, so-called wall boxes (for mounting in garages for example) or else the charging cable for connection to the electric vehicle. This charging infrastructure or EVSE therefore forms the interface between the load, electric vehicle, and the familiar electrical installation. A key requirement for the manner of operation of the charging infrastructure concerns, for example, a charging time for the electric vehicle which is as short as possible. This necessarily leads to a relatively high charging current which has to be made available over a relatively long charging time. Charging stations which are designed for charging electric vehicles in particular are designed for high charging currents of this kind.

When charging electric vehicles via a conventional domestic electrical installation, for example via so-called Schuko plug sockets which are very common in Germany, a permanently high charging current constitutes extreme loading since the conventional domestic electrical installation is not developed and designed for loads of this kind, that is to say for charging currents of such a level which flow over such a long charging time. This also applies, in particular, when using a so-called "inline module" which is carried along by the majority of electric vehicles as an "emergency charging unit". The electric vehicle can be connected to a conventional domestic connection plug socket with the aid of this "inline module" and can be charged by way of it. On account of the associated high long-term loading on the electrical installation—in particular on a 230 V domestic installation—the automobile industry requires temperature monitoring in so-called domestic connection plugs of the charging cable which is provided for contact to be made with the domestic installation at the supply system end, in order to ensure a safe charging process and to protect the plug socket against overheating and possibly against catching fire.

Currently available charging cables for charging the electric vehicle via a domestic plug socket therefore have a temperature sensor on the domestic connection plug, the temperature sensor registering a temperature increase in the region of the plug or the plug socket and sending a corresponding signal to a control device of the charging cable or of the electric vehicle. For this reason, the connection of an extension cable or a plug socket adapter on the domestic connection plug is not permissible either since it is not possible to ensure temperature monitoring of the domestic connection plug socket in this case.

Therefore, the charging cable or the inline module is, however, fixed on a specific domestic connection plug and therefore not suitable for any design of a domestic connection plug socket. This is problematical in as much as there are a large number of plug/plug socket variants which differ from country to country in Europe—but also worldwide. For example, "type F plugs" (so-called Schuko plugs, also called CEE 7/4 plugs), "type C plugs" (so-called Euro plugs, also called CEE 7/16 plugs) or CEE plugs (in accordance with DIN/EN/IEC 60309) can be used in Germany. In this case, the term "Schuko" commonly used in Germany is an acronym for the German term "Schutzkontakt", "protective contact" in English, and describes a system of plugs and plug sockets which is very common in Europe. However, in France "type E plugs" (CEE 7/5 plugs) and in Great Britain and the Commonwealth "type G plugs" (so-called Commonwealth plugs) are predominantly used as standardized electrical infrastructure plugs for domestic applications. This makes it considerably more difficult to use a specific inline module for cross-border journeys.

SUMMARY

At least one embodiment of the present invention provides an electrical connecting device and also a charging cable for an electric vehicle. In at least one embodiment, the electrical connecting device and charging cable ensure a safe charging process and are distinguished by a high degree of flexibility in respect of interaction with different electrical installation systems.

At least one embodiment of the invention is directed to an electrical connecting device. At least one embodiment of the invention is directed to charging cable. Advantageous refinements are the subject matter of the claims.

The electrical connecting device according to at least one embodiment of the invention is for a charging cable for charging an electric vehicle. In at least one embodiment, the electrical device includes a supply system-end first connecting device for electrically connecting the connecting device to an electrical power supply system and also a charging cable-end second connecting device for connecting the connecting device to a supply system-end plug of the charging cable.

In at least one embodiment, the first connecting device has at least two contact elements which are each electrically conductively connected to one of at least two contact elements of the second connecting device. Furthermore, the first connecting device has a first temperature sensor which serves for temperature monitoring purposes and is electrically connected to the second connecting device via a communications line. The second connecting device has a further contact which can be electrically conductively connected to a corresponding further contact of the supply system-end plug of the charging cable in order to transmit a signal from the temperature sensor to the charging cable.

The charging cable according to at least one embodiment of the invention for charging an electric vehicle is electrically conductively connected to at least one embodiment of an electrical connecting device described above by way of a supply system-end plug thereof. In this case, the charging cable has a communications line which electrically conductively connects the contact elements of the supply system-end plug to a control device of the charging cable, so that the first temperature sensor is electrically conductively connected to the control device.

BRIEF DESCRIPTION OF THE DRAWINGS

An example embodiment of the cable extension and also of the charging cable will be explained in greater detail below with reference to the appended figures, in which.

Identical parts are always provided with the same reference symbol throughout the various figures in the drawing. The description applies to all of the figures in the drawing in which the corresponding part is likewise shown.

DETAILED DESCRIPTION OF THE EXAMPLE EMBODIMENTS

Figure 1A:
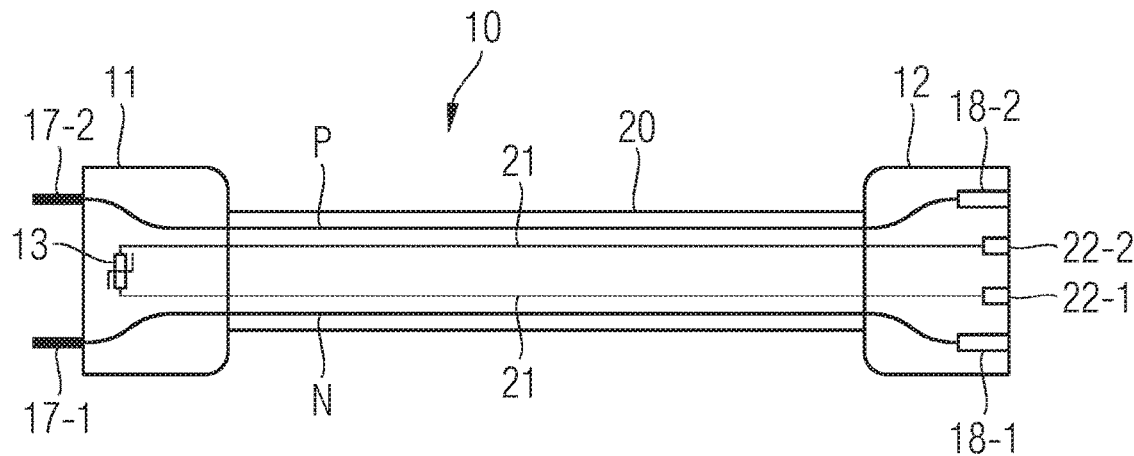
FIGS. 1A and 1B are schematic illustrations of two embodiments of the electrical connecting device according to the invention.

The electrical connecting device according to at least one embodiment of the invention is for a charging cable for charging an electric vehicle. In at least one embodiment, the electrical device includes a supply system-end first connecting device for electrically connecting the connecting device to an electrical power supply system and also a charging cable-end second connecting device for connecting the connecting device to a supply system-end plug of the charging cable.

In at least one embodiment, the first connecting device has at least two contact elements which are each electrically conductively connected to one of at least two contact elements of the second connecting device. Furthermore, the first connecting device has a first temperature sensor which serves for temperature monitoring purposes and is electrically connected to the second connecting device via a communications line. The second connecting device has a further contact which can be electrically conductively connected to a corresponding further contact of the supply system-end plug of the charging cable in order to transmit a signal from the temperature sensor to the charging cable.

With the aid of the electrical connecting device according to at least one embodiment of the invention, it is possible during charging of an electric vehicle via a domestic connection plug socket by way of a charging cable to ensure that the temperature of the domestic connection plug socket is monitored, even when the connecting device according to at least one embodiment of the invention is used. This ensures that the temperature is necessarily monitored at that connecting device which is plugged into the domestic connection plug socket in order to protect the domestic connection plug socket against overheating. This allows a high degree of flexibility of the charging process in respect of different electrical installation systems since the same charging cable can be matched to the respectively required plug design of the electrical installation used from country to country owing to the use of a suitable electrical connecting device. To this end, the connecting device can be in the form of a plug socket adapter for example. The temperature sensor used can be, for example, a thermal element.

In an advantageous development of the electrical connecting device, the contact elements of the first connecting device are electrically conductively connected to the contact elements of the second connecting device via a connecting cable. In this case, the electrical connecting device is additionally in the form of a cable extension. The "range" of the charging cable can be considerably increased in this way, as a result of which flexible adaptation to the respectively prevailing, specific charging situation or environment is possible. The charging convenience for the operator is considerably improved as a result.

In a further advantageous development of the electrical connecting device, the first connecting device or first connector is in the form of a first connecting plug, and the second connecting device or second connector is in the form of a second connecting plug. The design of the first and, respectively, of the second connecting devices as standardized electrical connecting plugs constitutes a simple and cost-effective way of configuring the connecting devices or connectors and thereby of conveniently charging the electric vehicle.

In a further advantageous development, the electrical connecting device has a coding medium for determining the current-carrying capacity of the connecting device, which coding medium can be read by way of the second connecting element. Information about the current-carrying capacity of the electrical connecting device can be stored with the aid of the coding medium, and the information can be read when a charging cable is connected. In this way, the current-carrying capacity of the cable extension can be ascertained without a great deal of expenditure, and therefore the charging current can be set in an optimum manner. The handling of the connecting device is simplified and the convenience of the charging process is further improved in this way.

In an advantageous development of the electrical connecting device, the coding medium is read by way of two contact elements which are arranged on the second connecting device and which can be electrically conductively connected to corresponding contact elements which are formed on the supply system-end plug of the charging cable. Reading the information stored in the coding medium by way of contact elements which are formed on the second connecting device constitutes a structurally simple and reliably functioning way of transmitting the stored information. However, other options, for example transmission via RFID, are also feasible.

In an advantageous development of the electrical connecting device, the coding medium is in the form of a coding resistor. In this case, the information which is to be stored is represented by way of the magnitude of the resistance value. The use of a resistor as coding medium constitutes a further extremely simple and cost-effective implementation alternative.

In a further advantageous development of the electrical connecting device, the first connecting device is in the form of a multifunctional plug. Owing to the use of a multifunctional plug which is suitable for interacting with different plug socket designs, the degree of flexibility in respect of the possible uses of the charging cable and also of the electrical connecting device is considerably increased.

The charging cable according to at least one embodiment of the invention for charging an electric vehicle is electrically conductively connected to at least one embodiment of an electrical connecting device described above by way of a supply system-end plug thereof. In this case, the charging cable has a communications line which electrically conductively connects the contact elements of the supply system-end plug to a control device of the charging cable, so that the first temperature sensor is electrically conductively connected to the control device.

With the aid of the charging cable according to at least one embodiment of the invention, it is possible to ensure that the temperature of the domestic connection plug socket is monitored even when using an electrical connecting device. Owing to the use of a connecting device which is in the form of a cable extension, it is firstly possible to increase the "range" of the charging cable, as a result of which the charging convenience is considerably increased on account of the flexible adaptation to the respectively prevailing, specific charging situation or environment. Secondly, the charging cable can be adapted in an extremely flexible manner to the respective country-specific electrical installation system owing to the use of the connecting device—be it in the form of a "real" cable extension or else in the form of a pure connecting plug.

In an advantageous development of at least one embodiment of the charging cable, the plug has a second temperature sensor for temperature monitoring purposes, which second temperature sensor is electrically conductively connected to the control device via the communications line. With the aid of the second temperature sensor, monitoring of the temperature of the domestic connection plug socket can also be ensured in cases in which the charging cable is operated from a domestic connection plug socket without the electrical connecting device. The flexibility in respect of the possible applications of the charging cable is further increased in this way.

In a further advantageous development of at least one embodiment of the charging cable, the plug has a switch which is arranged between the second temperature sensor and the communications line in order to bridge the second temperature sensor by opening when the connecting device is connected. In this way, it is ensured that, in cases in which the charging cable is operated from a domestic connection plug socket by way of a connected connecting device, the control device of the charging cable detects only the signal from the first temperature sensor, arranged in the domestic connection plug, that is to say in the first connecting device of the connecting device. This ensures safe and reliable monitoring of the domestic connection plug socket.

In a further advantageous development of at least one embodiment, the charging cable has a housing which, in addition to the control device, also comprises the supply system-end plug. This is particularly advantageous when the charging cable is operated only in interaction with the electrical connecting device. In this case, the connecting device serves both to match the charging cable to the special country-specific features, in particular the different shape factors, of the respective electrical installation and also to increase the available cable length. Since the connecting device is matched to the respectively country-specific electrical installation by variants of the connecting device which differ from country to country, the same charging cable can be sold and used in different markets. As a result, the charging cable can be produced in a more cost-effective manner owing to economies of scale.

Figure 1B:
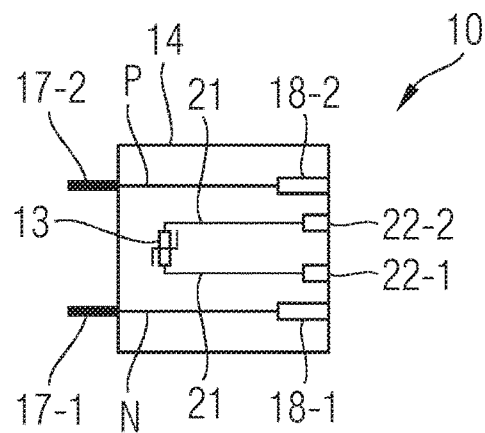

Two example embodiments of the electrical connecting device 10 for a charging cable 1 (see FIG. 2) for charging an electric vehicle (not illustrated) are schematically shown in FIGS. 1A and 1B. The connecting device 10 is intended to connect the charging cable 1 to an electrical power supply system (not illustrated) and in this way to supply an electric current to an electric vehicle which is connected to the charging cable 1.

Here, the connecting device 10 shown in FIG. 1A is in the form of a cable extension and has a first connecting device 11 and also a second connecting device 12, the first and second connecting devices being electrically conductively connected to one another via a connecting cable 20. In this case, the first connecting device or connector 11 is in the form of a first connecting plug and serves for contact to be established between the connecting device 10 and the electrical power supply system at the supply system end, for example via a conventional 230 V domestic connection plug socket. To this end, the first connecting device 11 has two contact elements 17-1 and 17-2 which are in the form of contact pins and which can be plugged into the domestic connection plug socket.

The second connecting device 12 is in the form of a second connecting plug and serves for charging cable-end connection of the connecting device 10 to a supply system-end plug 2 (see FIG. 2) of the charging cable 1. To this end, the second connecting device or connector 12 has two contact elements 18-1 and 18-2 which are in the form of contact bushes and into which two corresponding contact elements 7-1 and 7-2 of the charging cable 1 which are in the form of contact pins on the supply system-end plug 2 can be plugged. The contact elements 17-1 and 17-2 which are formed on the first connecting device 11 are electrically conductively connected to the contact bush 18-1 or 18-2 of the second connecting device 12 which is respectively associated with them via a first and, respectively, a second electrical line of the connecting cable 20.

Furthermore, the first connecting device 11 has a first temperature sensor 13 which can be in the form of a temperature-dependent resistor, for example in the form of a so-called PTC resistor. In the state in which current is supplied to the connecting device 10, the temperature sensor 13 serves to monitor the temperature of the first connecting device 11 and, respectively, of the respective domestic connection plug socket into which the connecting device 10 is plugged. To this end, the temperature sensor 13 is electrically conductively connected to two contact elements 22-1 and 22-2 of a further contact, which contact elements are formed on the second connecting device 12, via an electrical communications line 21 which is likewise accommodated in the connecting cable 20. In the illustrations of FIGS. 1A and 1B, the contact elements 22-1 and 22-2 are designed as two further contact bushes. A corresponding contact which is arranged on the charging cable 1 (see FIG. 2) accordingly has two further contact pins 8-1 and 8-2 which can be plugged into the contact bushes 22-1 and 22-2 in order to transmit an electrical signal which is generated by the temperature sensor 13 to the charging cable 1. However, it is likewise possible to form the further contact pins 8-1 and 8-2 on the second connecting device 12 of the connecting device 10, and also to form the further contact bushes 22-1 and 22-2 on the supply system-end plug 2 of the charging cable 1.

In contrast to the embodiment of the connecting device 10 shown in FIG. 1A, the embodiment shown in FIG. 1B does not have a connecting cable 20 but rather is in the form of an adapter plug. Here, the first connecting device 11 for establishing contact between the connecting device 10 and the electrical power supply system at the supply system end and also the second connecting device 12 for connection to the charging cable 1 at the charging cable end are accommodated in a common housing 14. In this housing 14, the electrical contact elements 17-1 and 17-2 of the first connecting device 11 are once again electrically conductively connected to the electrical contact elements 18-1 and 18-2. The first temperature sensor 13 and also the communications line 21 are likewise accommodated in the housing 14.

In the illustrations of FIGS. 1A and 1B, the electrical connection between the contact pins 17-1 and 17-2 and the contact bushes 18-1 and 18-2 is implemented via two electrical lines which are called the phase or outer conductor P and the neutral conductor N. However, it is likewise possible to supply power to the electric vehicle, this being done via these two electrical lines, in the form of so-called "phase-phase supply arrangement" by way of two phase conductors. Furthermore, it is possible to supply power via three phase conductors, wherein the first connecting device 11 would be designed for connection to a corresponding three-phase AC power supply system in this case.

Figure 2:
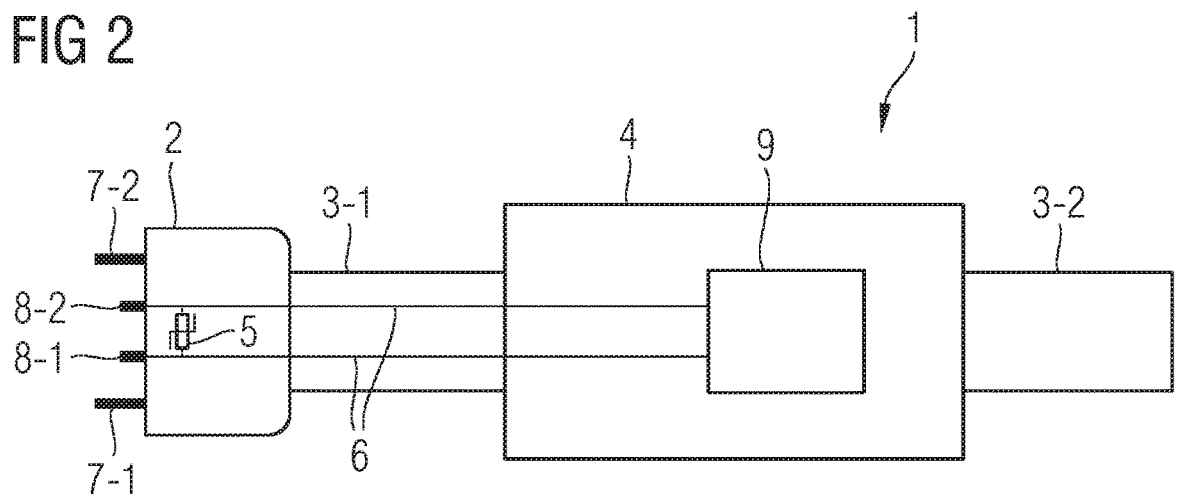
FIG. 2 is a schematic illustration of the charging cable according to an embodiment of the invention.

FIG. 2 schematically shows the charging cable 1 which corresponds to the connecting device 10 shown in FIG. 1 and which is also referred to as a so-called "inline module". The charging cable has a supply system-end plug 2 which is designed to establish contact at the supply system end with an electrical power supply system or to establish contact with the charging cable-end connecting device 12 of the connecting device 10. To this end, the plug 2 has two contact elements 7-1 and 7-2 which are in the form of contact pins and which can be plugged into the domestic connection plug socket or the contact bushes 18-1 and 18-2 of the second connecting device 12 in order to establish an electrically conductive connection. The plug 2 is electrically conductively connected to a control device 4 of the charging cable 1 via a first cable section 3-1. However, it is likewise possible to integrate the plug 2 together with the control device 4 into a common housing. In this case, the first cable section 3-1, which connects the plug to the control device 4, is likewise integrated into the housing. The charging cable 1 can be electrically conductively connected to an electric vehicle (not illustrated) via a second cable section 3-2 which is likewise electrically conductively connected to the control device 4.

The plug 2 also has a second temperature sensor 5 which is electrically conductively connected to a microcontroller 9 of the control device 4 via a second communications line 6.

The second temperature sensor 5 can likewise be in the form of a temperature-dependent resistor and serves to monitor the temperature of the plug 2 and, respectively, of the domestic connection plug socket if the plug 2 is plugged into a domestic connection plug socket. In this case, the signal which is generated by the second temperature sensor 5 is compared with a reference value. If the reference value is exceeded, a reduction or interruption in the charging current can be initiated by the microcontroller 9. An electrically conductive connection to the first temperature sensor 13 which is arranged in the supply system-end first connecting device 11 of the cable extension 10 can be implemented by way of the further contact pins 8-1 and 8-2 which are formed on the plug 2 and which can be plugged into the further contact bushes 22-1 and 22-2 of the connecting device 10. If the charging cable 1 is connected to the electrical power supply system via the connecting device 10, both the signal from the second temperature sensor 5 and also the signal from the first temperature sensor 13 can be monitored and processed with the aid of the microcontroller 9.

Figure 3A:
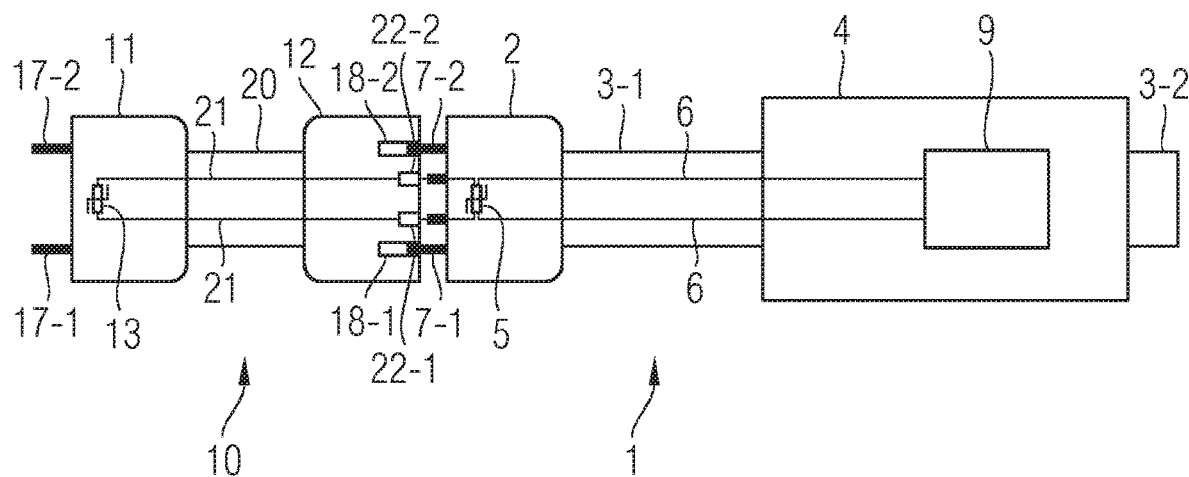
FIG. 3A is a schematic illustration of the charging cable with a connected connecting device.
Figure 3B:
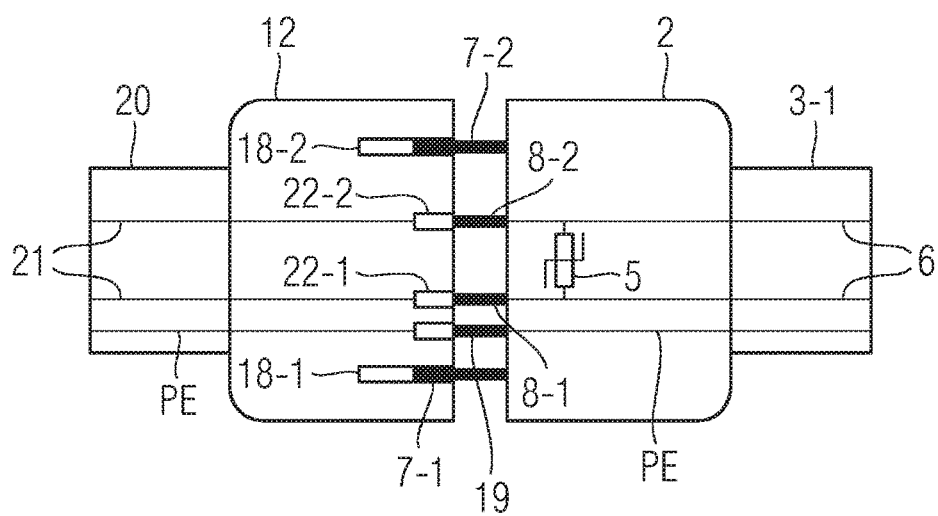
FIG. 3B is a schematically enlarged illustration of a region in which the charging cable is connected to the connecting device.

The charging cable 1 with the connecting device 10 connected is schematically illustrated in FIGS. 3A and 3B, wherein FIG. 3B shows an enlarged illustration of a region in which the connecting device 10 is connected to the charging cable 1.

FIG. 3A substantially shows a combination of the connecting device 10 illustrated in FIG. 1A with the charging cable 1 illustrated in FIG. 2. In the FIG. 3A, the two contact pins 7-1 and 7-2 of the plug 2 are plugged into the two contact bushes 18-1 and 18-2 of the second connecting device 12 of the connecting device 10 in order to electrically conductively connect the phase conductor and neutral conductor of the charging cable 1 to the phase conductor and neutral conductor of the connecting device 10. In the case of a phase-phase supply arrangement, two phase conductors are electrically conductively connected. Furthermore, the two further contact pins 8-1 and 8-2 of the plug 2 are also plugged into the corresponding further contact bushes 22-1 and 22-2 of the second connecting plug 12. In this way, an electrically conductive connection is established between the communications line 21 of the connecting device 10 and the communications line 6 of the charging cable 1 in order to also transmit the signal from the first temperature sensor 13 to the microcontroller 9 of the charging cable 1.

FIG. 3B schematically shows an enlarged illustration of the connecting region, that is to say the region in which the second connecting plug 12 of the connecting device 10 is connected to the plug 2 of the charging cable 1. In addition to the electrical connection of the phase conductors and neutral conductors via the contact pins 7-1 and 7-2 which are plugged into the contact bushes 18-1 and 18-2 and also the connection of the communications lines 6 and 21 via the contact pins 8-1 and 8-2 which are plugged into the contact bushes 22-1 and 22-2, FIG. 3B shows an additional PE plug contact 19 which is formed between the second connecting device 12 and the plug 2. An electrically conductive connection of a protective conductor PE which is routed in the charging cable 1 and also in the connecting device 10 can be realized by way of this PE plug contact 19. To this end, the first connecting device 11 of the connecting device 10 has to have a corresponding additional contact (not illustrated) by which electrically conductive contact with the PE contact of the domestic connection plug socket can be implemented when the first connecting device is plugged in.

Figure 4:
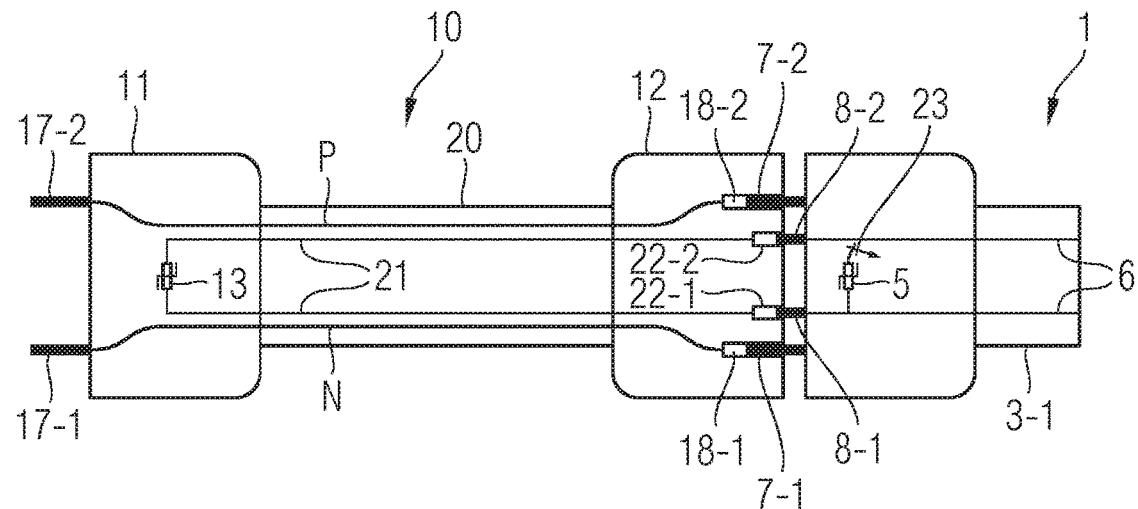
FIG. 4 is a schematic illustration of a further example embodiment of the charging cable.

FIG. 4 schematically shows a further example embodiment of the charging cable 1 according to an embodiment of the invention with the connecting device 10 connected to it.

In the figure, the plug 2 of the charging cable 1 has a switch 23 which is arranged between the second temperature sensor 5 and the communications line 6 of the charging cable 1. In this case, the switch 23 is operated in such a way that it is opened when electrical contact is established between the charging cable 1 and the connecting device 10, in order to in this case, that is to say when the connecting device 10 is connected, bridge the second temperature sensor 5 which is arranged in the plug 2 of the charging cable 1. In principle, both a mechanical switch and also an electrical switch can be used for this purpose. In this way, it is ensured that the control device 4 detects only the signal from that temperature sensor 5 or 13 of which the associated plug socket plug is also plugged into the domestic connection plug socket of the electrical installation. This ensures safe and reliable monitoring of the domestic connection plug socket.

Figure 5A:
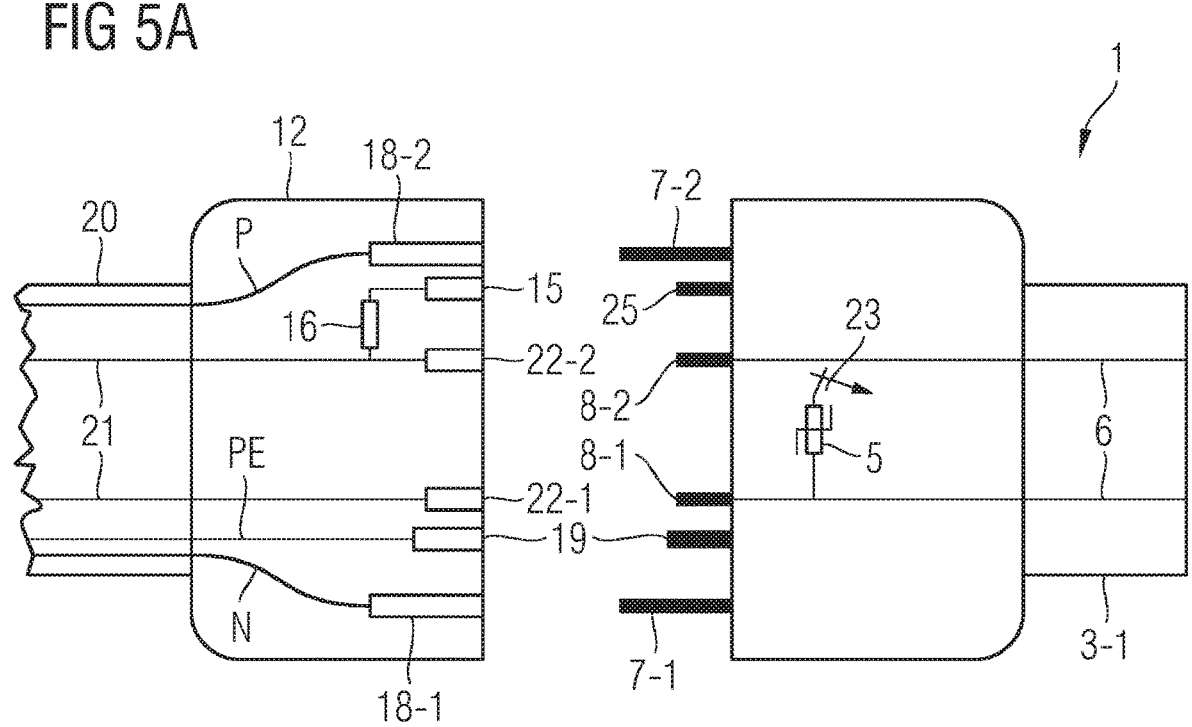
FIGS. 5A to 5D are schematic illustrations of further embodiments of the connecting device.

Further embodiments of the connecting device 10 according to the invention are schematically illustrated in FIGS. 5A to 5D. In the figures, FIG. 5A shows the connecting device 10 in interaction with the charging cable 1 which is to be connected. In contrast to the illustration in FIG. 3A, the second connecting device 12 additionally has a coding medium, which is in the form of a coding resistor 16, for determining the current-carrying capacity of the connecting device 10. This coding resistor 16 is electrically conductively connected, at its first connection, to the further contact element 22-2 via a section of the communications line 21 of the connecting device 10. By way of its second connection, the coding resistor 16 is electrically conductively connected to a further contact element 15 which is likewise formed on the second connecting device 12. This further contact element 15 forms a further contact with a corresponding further contact element 25, which is formed on the plug 2, when the charging cable 1 is connected, it being possible for the information relating to the current-carrying capacity of the cable extension 10 to be transmitted to the control device 4 of the charging cable 1 via the further contact.

Figure 5B:
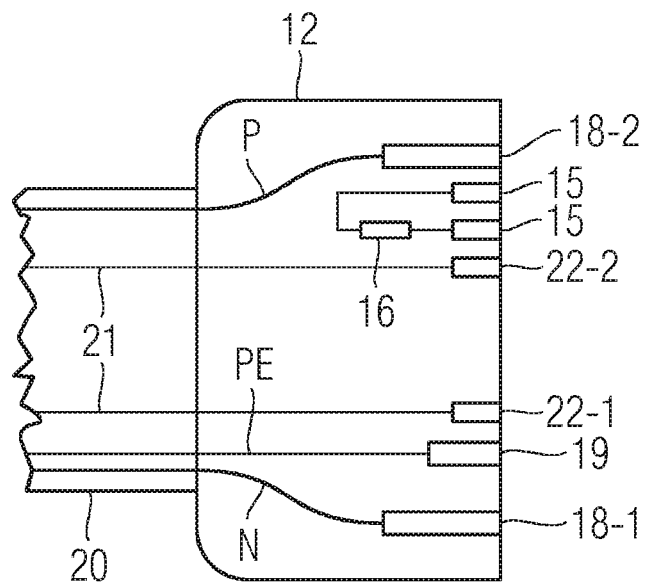
Figure 5C:
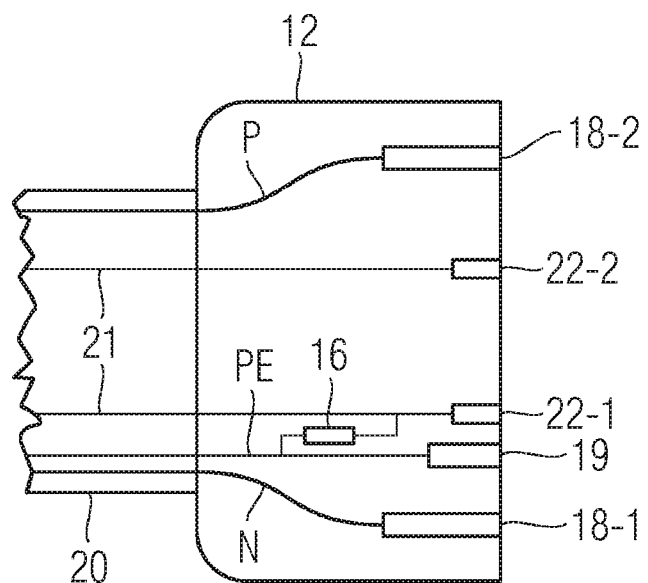
Figure 5D:
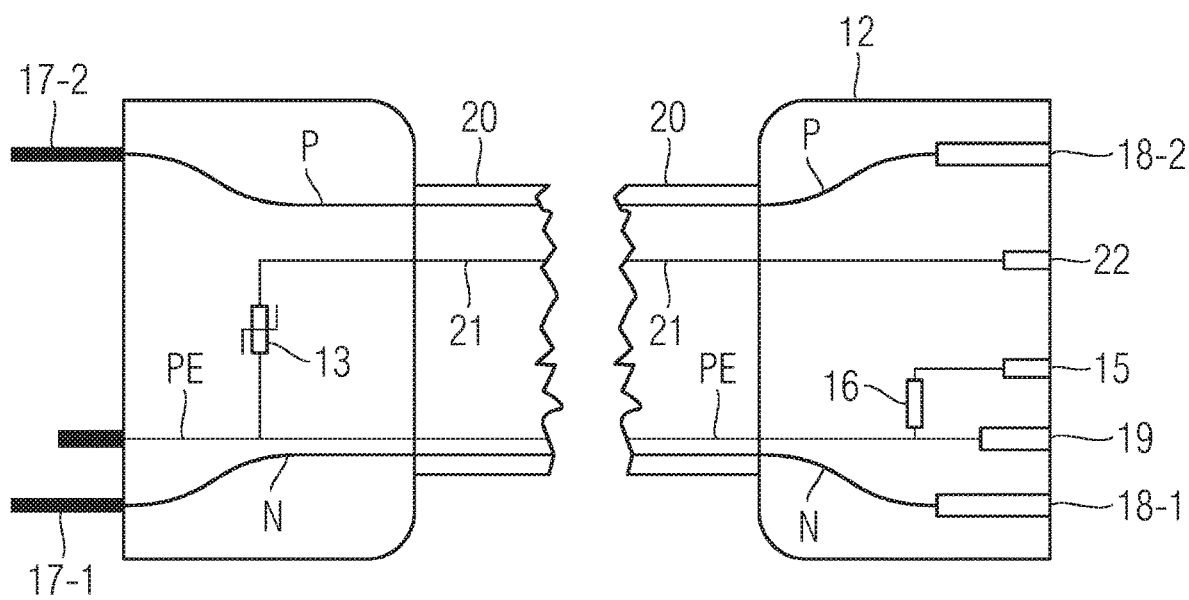

FIGS. 5B to 5D show further possible ways of integrating the coding resistor 16. In FIG. 5B, the coding resistor is electrically connected between two further contact elements 15 which are formed on the second connecting device 12. In FIG. 5C however, the coding resistor 16 is electrically conductively connected firstly to the further contact element 22-1 which is electrically conductively connected to the first temperature sensor 13 via the communications line 21. Secondly, the coding resistor 16 is electrically conductively connected to the PE contact element 19 via a section of the protective conductor PE. This results in the advantage that no dedicated further contact elements which are formed on the second connecting device 12 are required for reading the coding resistor 16.

Finally, a further possible way of electrically connecting the coding resistor 16 and the first temperature sensor 13 is schematically illustrated in FIG. 5D. In the figure, the first connection of the coding resistor 16 is electrically conductively connected to the PE contact element 19 via a section of the protective conductor PE, in accordance with the example embodiment which is illustrated in FIG. 5C. The second connection of the coding resistor 16 is—in accordance with the example embodiment shown in FIG. 5A—electrically conductively connected to the further contact element 15. However, in contrast to the previous example embodiments, only one connection of the temperature sensor 13 is further electrically conductively connected to a further contact element 22-1. The second connection is electrically conductively connected to the PE contact element 19 via the protective conductor PE. On account of this electrical arrangement, one of the two communications lines 21 and also one of the further contact elements 15 can be saved.

In the figures of the drawing, the charging cable 1 is always shown as an independent charging cable which can also be used without a connecting device 10. However, it is likewise possible to form the charging cable 1 with a proprietary, non-standard plug 2 which cannot be plugged into one of the customary domestic connection plug sockets but rather only into a second connecting device 12 of correspondingly complementary configuration of the electrical connecting device 10 according to an embodiment of the invention. This results in the advantage that the charging cable 1 can be configured independently of the standards which differ from country to country since the country-specific adaptation is performed by way of the connecting device 10 in each case. In this case, the second temperature sensor 5 which is arranged in the plug 2 is not required either since, in this case, the temperature of the domestic connection plug socket is always monitored via the first temperature sensor 13 which is arranged in the first connecting device 11 of the connecting device 10.

Furthermore, it is likewise possible to configure the charging cable 1 in such a way that the plug 2 is directly integrated into a housing of the inline module and not, as is shown in the figures of the drawing, connected to the inline module via a flexible cable.

This is advantageous particularly when the charging cable 1, as described above, cannot be used as an independent charging cable but rather only in connection with a connecting device 10 which corresponds to the country-specific standard. In this case, the connecting device 10 acts both as a cable extension and also as an adapter for adapting to the respectively prevailing electrical infrastructure.

Furthermore, the control device 4 is always shown as an integral constituent part of the charging cable 1 in the above-described example embodiments. However, it is likewise possible to use a control device which is arranged at the electric vehicle end and serves to control the charging process and also the temperature monitoring operation. In this case, the signal from the first temperature sensor 13 would be routed through the charging cable 1 only by way of the communications line 6, in order to further process the signal by way of the control device which is arranged on the electric vehicle.

LIST OF REFERENCE SYMBOLS

1 Charging cable
2 Supply system-end plug
3-1 First cable section
3-2 Second cable section
4 Control device
5 Second temperature sensor
6 Communications line
7-1 Contact element/contact pin
7-2 Contact element/contact pin
8-1 Further contact pin
8-2 Further contact pin
9 Microcontroller
10 Connecting device
11 First connecting device
12 Second connecting device
13 First temperature sensor
14 Housing
15 Further contact element
16 Coding resistor 17-1 Contact element/contact pin
17-2 Contact element/contact pin
18-1 Contact element/contact bush
18-2 Contact element/contact bush
19 PE contact element/PE plug contact
20 Connecting cable
21 Communications line
22-1 Further contact element
22-2 Further contact element
23 Switch
25-1 Further contact element
25-2 Further contact element
P Phase conductor
N Neutral conductor
PE Protective conductor

The invention claimed is:

1. An electrical connecting device for extending a charging cable for charging an electric vehicle, the electrical connecting device comprising:
 a supply system-end first connecting device configured to electrically connect the electrical connecting device to an electrical power supply system;
 a charging cable-end second connecting device configured to electrically connect the electrical connecting device to a supply system-end plug of the charging cable; and
 a connecting cable,
 the supply system-end first connecting device and the charging cable-end second connecting device being electrically conductively connected to one another via the connecting cable,
 the supply system-end first connecting device including at least two contact elements, each of the at least two contact elements electrically conductively connected to one of at least two contact elements of the charging cable-end second connecting device,
 the supply system-end first connecting device including a first temperature sensor at the supply system-end first connecting device and configured to monitor a temperature at the supply system-end first connecting device, the first temperature sensor being electrically connected to the charging cable-end second connecting device via a first temperature signal communications line configured to transmit a temperature signal from the first temperature sensor to a further contact of the charging cable-end second connecting device, the further contact of the charging cable-end second connecting device being electrically conductively connectable to a corresponding further contact of the supply system-end plug of the charging cable, and configured to transmit a signal from the first temperature sensor to the charging cable.

2. The electrical connecting device of claim 1, wherein the at least two contact elements of the supply system-end first connecting device are electrically conductively connected to the at least two contact elements of the charging cable-end second connecting device via a connecting cable.

3. The electrical connecting device of claim 2, wherein the supply system-end first connecting device includes a first connecting plug, and the charging cable-end second connecting device includes a second connecting plug.

4. The electrical connecting device of claim 3, further comprising:
 a coding medium to determine current-carrying capacity of the electrical connecting device, the coding medium being readable via the charging cable-end second connecting element.

5. The electrical connecting device of claim 4, wherein the coding medium is readable via two contact elements arranged on the charging cable-end second connecting device, the two contact elements being electrically conductively connected to corresponding contact elements formed on the supply system-end plug of the charging cable.

6. The electrical connecting device of claim 4, wherein the coding medium is in the form of a coding resistor.

7. The electrical connecting device of claim 2, wherein the supply system-end first connecting device is a first connecting plug, and the charging cable-end second connecting device is a second connecting plug.

8. The electrical connecting device of claim 2, further comprising:
 a coding medium to determine current-carrying capacity of the electrical connecting device, the coding medium being readable via at least one of the two charging cable-end second contact elements.

9. The electrical connecting device of claim 8, wherein the coding medium is readable via two contact elements arranged on the charging cable-end second connecting device, the two contact elements being electrically conductively connected to corresponding contact elements formed on the supply system-end plug of the charging cable.

10. The electrical connecting device of claim 8, wherein the coding medium is in the form of a coding resistor.

11. The electrical connecting device of claim 2, wherein the supply system-end first connecting device includes a multifunctional plug.

12. The electrical connecting device of claim 2, wherein the supply system-end first connecting device is a multifunctional plug.

13. A charging cable for charging an electric vehicle, the charging cable being electrically conductively connectable to the electrical connecting device of claim 2 via the supply system-end plug, the charging cable comprising:
 a communications line, capable of electrically conductively connecting the at least two contact elements of the supply system-end plug to a control device of the charging cable, to electrically conductively connect the first temperature sensor to the control device.

14. The charging cable of claim 13, wherein the supply system-end plug includes a second temperature sensor for temperature monitoring purposes, the second temperature sensor being electrically conductively connected to the control device via the communications line.

15. The charging cable of claim 14, wherein the supply system-end plug includes a switch, arranged between the second temperature sensor and the communications line, to bridge the second temperature sensor by opening when a cable extension is connected.

16. The charging cable of claim 13, further comprising:
 a housing including, in addition to the control device, the supply system-end plug.

17. The electrical connecting device of claim 1, wherein the supply system-end first connecting device includes a first connecting plug, and the charging cable-end second connecting device includes a second connecting plug.

18. The electrical connecting device of claim 1, further comprising:
 a coding medium configured to determine current-carrying capacity of the electrical connecting device, the coding medium being readable via the charging cable-end second connecting device.

19. The electrical connecting device of claim 18, wherein the coding medium is readable via two contact elements arranged on the charging cable-end second connecting device, the two contact elements being electrically conductively connected to corresponding contact elements formed on the supply system-end plug of the charging cable.

20. The electrical connecting device of claim 19, wherein the coding medium is in the form of a coding resistor.

21. The electrical connecting device of claim 18, wherein the coding medium is in the form of a coding resistor.

22. The electrical connecting device of claim 1, wherein the supply system-end first connecting device includes a multifunctional plug.

23. A charging cable for charging an electric vehicle, the charging cable being electrically conductively connectable to the electrical connecting device of claim 1 via the supply system-end plug of the charging cable, the charging cable comprising:
 a second temperature signal communications line, configured to electrically conductively connect at least two contact elements of the supply system-end plug of the charging cable to a control device of the charging cable, to electrically conductively connect the first temperature sensor to the control device.

24. The charging cable of claim 23, wherein the supply system-end plug of the charging cable includes a second temperature sensor for temperature monitoring purposes, the second temperature sensor being electrically conductively connected to the control device via the communications line.

25. The charging cable of claim 24, wherein the supply system-end plug of the charging cable includes a switch, arranged between the second temperature sensor and the communications line, to bridge the second temperature sensor by opening when a cable extension is connected.

26. The charging cable of claim 23, further comprising:
 a housing that houses the control device and the supply system-end plug.

27. The electrical connecting device of claim 1, wherein the supply system-end first connecting device is a multifunctional plug.

28. The electrical connecting device of claim 1, wherein the electrical connecting device is an adapter removably connectable to the electrical power supply system and the charging cable.

29. A charging system, comprising:
 a charging cable for charging an electric vehicle, the charging cable including:
  a control device, and
  a supply system-end plug with the supply system-end plug electrically conductively connected to the control device via a cable section; and
 an electrical connecting device for extending or adapting the charging cable, the electrical connecting device including:
  a supply system-end first connecting device configured to electrically connect the electrical connecting device to an electrical power supply system,
  a charging cable-end second connecting device configured to electrically connect the electrical connecting device to the supply system-end plug of the charging cable, and
  a connecting cable,
   the supply system-end first connecting device and the charging cable-end second connecting device being electrically conductively connected to one another via the connecting cable, wherein
  the supply system-end first connecting device includes a first temperature sensor at the supply system-end first connecting device and configured to monitor a temperature at the supply system-end first connecting device, the first temperature sensor being electrically connected to the charging cable-end second connecting device via a first temperature signal communications line configured to transmit a temperature signal from the first temperature sensor to a further contact of the charging cable-end second connecting device, the further contact of the charging cable-end second connecting device being electrically conductively connectable to a corresponding further contact of the supply system-end plug of the charging cable, and configured to transmit a signal from the first temperature sensor to the charging cable.

* * * * *